United States Patent
Liu et al.

(10) Patent No.: US 12,550,271 B2
(45) Date of Patent: Feb. 10, 2026

(54) FOLDABLE DISPLAY SCREEN ASSEMBLY

(71) Applicants: Chengdu BOE Optoelectronics Technology Co., Ltd., Sichuan (CN); BOE Technology Group Co., Ltd., Beijing (CN)

(72) Inventors: Chang Liu, Beijing (CN); Binfeng Feng, Beijing (CN); Chao Wang, Beijing (CN); Yangyang Cai, Beijing (CN); Jiaxiang Wang, Beijing (CN); Zhiliang Jiang, Beijing (CN); Pan Zhao, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 904 days.

(21) Appl. No.: 17/788,103

(22) PCT Filed: Sep. 1, 2021

(86) PCT No.: PCT/CN2021/115893
§ 371 (c)(1),
(2) Date: Jun. 22, 2022

(87) PCT Pub. No.: WO2022/088944
PCT Pub. Date: May 5, 2022

(65) Prior Publication Data
US 2023/0026336 A1    Jan. 26, 2023

(30) Foreign Application Priority Data
Oct. 26, 2020   (CN) .......................... 202011159037.0

(51) Int. Cl.
*H05K 5/02*        (2006.01)
*B32B 1/00*        (2024.01)
(Continued)

(52) U.S. Cl.
CPC ................. *H05K 5/02* (2013.01); *B32B 1/00* (2013.01); *B32B 7/022* (2019.01); *B32B 7/12* (2013.01);
(Continued)

(58) Field of Classification Search
None
See application file for complete search history.

(56) References Cited

U.S. PATENT DOCUMENTS

| | | | |
|---|---|---|---|
| 2006/0132030 A1* | 6/2006 | Gao ........................ | H10K 59/87 313/511 |
| 2011/0149211 A1* | 6/2011 | Ha .......................... | B05D 5/10 359/483.01 |

(Continued)

FOREIGN PATENT DOCUMENTS

| | | |
|---|---|---|
| CN | 106548712 A | 3/2017 |
| CN | 107978623 A | 5/2018 |

(Continued)

*Primary Examiner* — Eli D. Strah
(74) *Attorney, Agent, or Firm* — IPro, PLLC (57) ABSTRACT

A foldable display screen assembly has a flat area and a curved-surface area. The foldable display screen assembly includes a flexible display module including a flat display portion and a curved-surface display portion. The flexible display module has a display surface and a back surface opposite the display surface. The foldable display screen assembly further includes a flexible support layer attached to the back surface of the flexible display module by an adhesive. The flexible support layer includes a flat support portion and a curved-surface support portion. The foldable display screen assembly further includes a rigid protective structure attached to the display surface of the flexible display module. The rigid protective structure includes a flat protective portion and a curved-surface protective portion.

(Continued)

The elastic modulus of the rigid protective structure is greater than the elastic modulus of the flexible support layer.

20 Claims, 5 Drawing Sheets

(51) Int. Cl.
| | |
|---|---|
| *B32B 7/022* | (2019.01) |
| *B32B 7/12* | (2006.01) |
| *B32B 7/14* | (2006.01) |
| *B32B 15/04* | (2006.01) |
| *B32B 15/18* | (2006.01) |
| *B32B 17/06* | (2006.01) |
| *B32B 27/06* | (2006.01) |
| *B32B 27/36* | (2006.01) |
| *G06F 1/16* | (2006.01) |
| *G09F 9/30* | (2006.01) |

(52) U.S. Cl.
CPC ............ *B32B 7/14* (2013.01); *B32B 15/04* (2013.01); *B32B 15/18* (2013.01); *B32B 17/06* (2013.01); *B32B 27/06* (2013.01); *B32B 27/36* (2013.01); *B32B 27/365* (2013.01); *G06F 1/1652* (2013.01); *B32B 2307/54* (2013.01); *B32B 2307/546* (2013.01); *B32B 2307/732* (2013.01); *B32B 2457/20* (2013.01); *G09F 9/301* (2013.01)

(56) References Cited

U.S. PATENT DOCUMENTS

| | | |
|---|---|---|
| 2017/0080680 A1 | 3/2017 | Lee et al. |
| 2019/0293921 A1* | 9/2019 | Nam ................ B32B 7/023 |
| 2022/0097339 A1 | 3/2022 | Liu et al. |

FOREIGN PATENT DOCUMENTS

| | | | | |
|---|---|---|---|---|
| CN | 111131570 A | * | 5/2020 | .......... H04M 1/0266 |
| CN | 111136960 A | | 5/2020 | |
| CN | 111605282 A | | 9/2020 | |
| CN | 111627338 A | | 9/2020 | |
| CN | 111681543 A | | 9/2020 | |
| CN | 112164314 A | | 1/2021 | |
| CN | 112331072 A | | 2/2021 | |
| WO | 2022088944 A1 | | 5/2022 | |

* cited by examiner

FOLDABLE DISPLAY SCREEN ASSEMBLY

CROSS REFERENCE TO RELATED APPLICATIONS

The present application is a national phase entry under 35 U.S.C. § 371 of International Application No. PCT/CN2021/115893, filed on Sep. 1, 2021, which claims priority to Chinese Patent Application No. 202011159037.0, filed with the China National Intellectual Property Administration on Oct. 26, 2020 and entitled "FOLDABLE DISPLAY SCREEN ASSEMBLY", the entire contents of which are incorporated herein by reference.

FIELD

The present disclosure relates to the technical field of display, in particular to a foldable display screen assembly.

BACKGROUND

With the continuous development of a display technology, display devices have been widely used in people's daily life and work. A foldable display screen has the advantages of being foldable, light and thin, and is more and more popular.

For a foldable display screen with a curved-surface design on an edge, in order to ensure that the foldable display screen can be bent, a display film layer and a protective cover plate in a display module are both made of flexible materials with a certain elastic modulus. After the display module and a support layer are subjected to curved-surface attaching, there will be a strong rebound force on a curved surface. Therefore, after the curved-surface attaching is stopped for a long time, a colloid between the display module and the support layer will crack due to the action of the rebound force, thereby affecting assembly of a whole machine.

SUMMARY

Embodiments of the present disclosure provide a foldable display screen assembly. The foldable display screen assembly is divided into a flat area and a curved-surface area that is connected to the flat area and is located on an edge of at least one side of the flat area.

The foldable display screen assembly includes:
a flexible display module, including: a flat display portion located within the flat area and a curved-surface display portion that is connected to the flat display portion and is located within the curved-surface area, wherein the flexible display module includes: a display surface and a back surface opposite to the display surface;
a flexible support layer, attached to the back surface of the flexible display module by means of an adhesive, wherein the flexible support layer includes: a flat support portion located within the flat area and a curved-surface support portion that is connected to the flat support portion and is located within the curved-surface area; and
a rigid protective structure, attached to the display surface of the flexible display module, wherein the rigid protective structure includes: a flat protective portion located within the flat area and a curved-surface protective portion that is connected to the flat protective portion and is located within the curved-surface area, and an elastic modulus of the rigid protective structure is greater than an elastic modulus of the flexible support layer.

Optionally, in the embodiments of the present disclosure, in the curved-surface area, an outer edge of the curved-surface protective portion exceeds an outer edge of the curved-surface display portion.

Optionally, in the embodiments of the present disclosure, a thickness of the curved-surface protective portion is greater than a thickness of the flat protective portion.

Optionally, in the embodiments of the present disclosure, in a direction that the flat area points to the curved-surface area, the thickness of the curved-surface protective portion tends to increase gradually.

Optionally, in the embodiments of the present disclosure, a surface of a side, facing away from the flexible display module, of the curved-surface protective portion is flush with a surface of a side, facing away from the flexible display module, of the flat protective portion.

A thickness of a part, attached to the curved-surface display portion, in the curved-surface protective portion increases gradually in the direction that the flat area points to the curved-surface area.

A thickness of a part, exceeding the outer edge of the curved-surface display portion, in the curved-surface protective portion is consistent.

Optionally, in the embodiments of the present disclosure, the flat protective portion has a hollowed-out structure; and/or the curved-surface protective portion has a hollowed-out structure.

Optionally, in the embodiments of the present disclosure, the elastic modulus of the rigid protective structure is greater than or equal to 7.5 GPa.

Optionally, in the embodiments of the present disclosure, a material of the rigid protective structure is glass, steel, polycarbonate or polyethylene terephthalate.

Optionally, in the embodiments of the present disclosure, the rigid protective structure is attached to a side, facing away from the flexible support layer, of the flexible display module by means of an adhesive layer.

A viscosity of the adhesive layer is smaller than or equal to 100 gf.

Optionally, in the embodiments of the present disclosure, the adhesive layer includes: at least two discrete adhesive portions.

Optionally, in the embodiments of the present disclosure, the adhesive portions are in strip shapes.

The flat area includes: two opposite first sides, and two opposite second sides. The curved-surface area is connected to the first side(s).

An extension direction of each adhesive portion is consistent with an extension direction of each first side, and a length of each adhesive portion is consistent with a length of each first side.

Optionally, in the embodiments of the present disclosure, the adhesive layer is an ultraviolet viscosity reducing adhesive, a double-sided adhesive, a pressure-sensitive adhesive or a hot-melt adhesive.

Optionally, in the embodiments of the present disclosure, the flexible display module includes: a display film layer and a flexible cover plate located on a side, facing away from the flexible support layer, of the display film layer.

The foldable display screen assembly further includes: a protective film located between the flexible display module and the rigid protective structure.

The protective film covers the flat display portion and at least part of the curved-surface display portion of the flexible display module.

Optionally, in the embodiment of the present disclosure, in the curved-surface area, an edge of the flexible cover plate exceeds an edge of the protective film; and/or in the curved-surface area, an outer edge of the protective film exceeds an outer edge of the adhesive layer.

Optionally, in the embodiments of the present disclosure, the foldable display screen assembly further includes: a bonding component.

One end of the bonding component is bonded with a surface, facing away from the flexible support layer, of the rigid protective structure, and the other end is bent and bonded to a surface of a side, facing away from the rigid protective structure, of the flexible support layer.

DETAILED DESCRIPTION OF THE EMBODIMENTS

In the related art, for a foldable display screen with a curved-surface design on an edge, after a display module and a support layer are subjected to curved-surface attaching, and after a long period of stopping, a colloid between the display module and the support layer will crack due to the action of a rebound force, thereby affecting assembly of a whole machine. In addition, in the related art, no colloid can keep the display module and the support layer fully attached after long-term attaching. Based on this, embodiments of the present disclosure provide a foldable display screen assembly.

The implementations of the foldable display screen assembly provided by the embodiments of the present disclosure will be described in detail below with reference to the accompanying drawings. The thickness and shape of each film layer in the accompanying drawings do not reflect the true ratio, and the purpose is only to illustrate the content of the present disclosure schematically.

Figure 1:
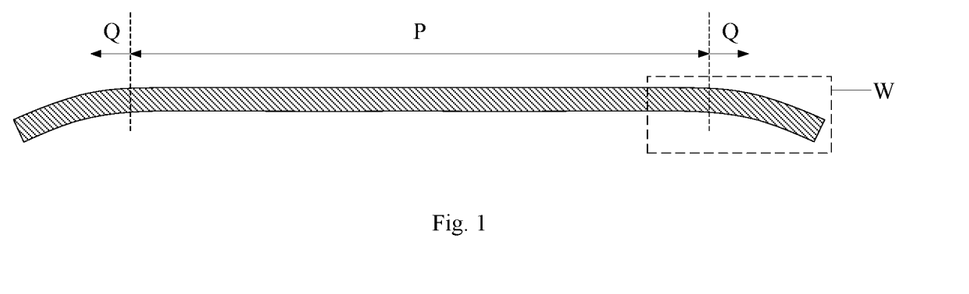
FIG. 1 is a side view of a foldable display screen assembly provided by an embodiment of the present disclosure.

Embodiments of the present disclosure provide a foldable display screen assembly. FIG. 1 is a side view of the foldable display screen assembly provided by an embodiment of the present disclosure. As shown in FIG. 1, the foldable display screen assembly is divided into a flat area P and a curved-surface area Q that is connected to the flat area P and is located on an edge of at least one side of the flat area P.

Figure 2:
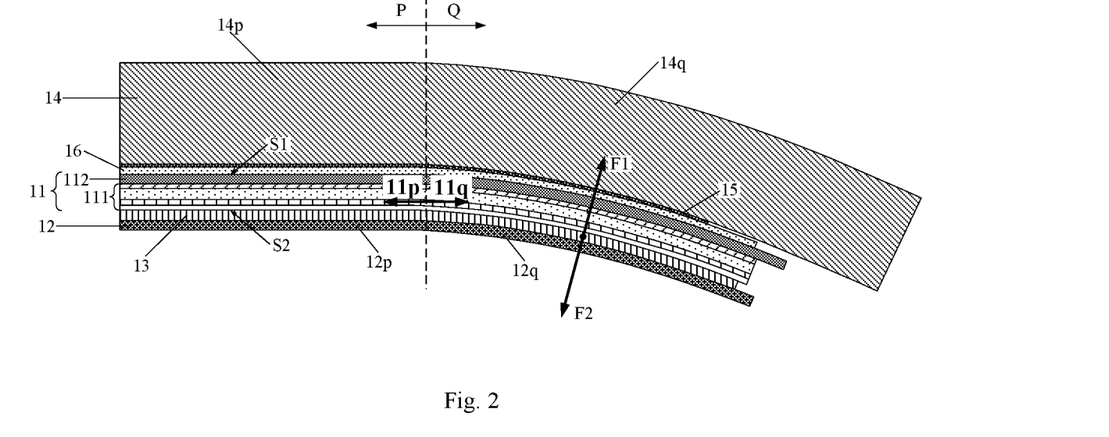
FIG. 2 is a partial enlarged schematic diagram at a dotted-line frame W in FIG. 1.

FIG. 2 is a partial enlarged schematic diagram at a dotted-line frame W in FIG. 1. Referring to FIG. 2, the foldable display screen assembly may include:

a flexible display module 11, including: a flat display portion 11$p$ located in the flat area P and a curved-surface display portion 11$q$ that is connected to the flat display portion 11$p$ and is located in the curved-surface area(s) Q. The flexible display module includes: a display surface S1 and a back surface S2 opposite to the display surface S1;

a flexible support layer 12, attached to the back surface S2 of the flexible display module 11 by means of an adhesive 13. The flexible support layer 12 includes: a flat support portion 12$p$ located in the flat area P and a curved-surface support portion 12$q$ that is connected to the flat support portion 12$p$ and is located in the curved-surface area Q; and a rigid protective structure 14, attached to the display surface S1 of the flexible display module 11. The rigid protective structure 14 includes: a flat protective portion 14$p$ located in the flat area P and a curved-surface protective portion 14$q$ that is connected to the flat protective portion 14$p$ and is located in the curved-surface area Q. An elastic modulus of the rigid protective structure 14 is greater than an elastic modulus of the flexible support layer 12.

In the foldable display screen assembly in the embodiments of the present disclosure, by attaching the rigid protective structure on the display surface of the flexible display module, the rigid protective structure can offset a rebound force generated by the flexible display module, so as to achieve a mechanical balance in the adhesive, prevent the adhesive between the flexible support layer and the flexible display module from cracking, and ensure the integrity of the foldable display screen assembly. Moreover, the elastic modulus of the rigid protective structure is greater than the elastic modulus of the flexible support layer, which can ensure that the rigid protective structure can offset the rebound force generated by the flexible display module.

In the embodiments of the present disclosure, by setting the rigid protective structure on the display surface of the flexible display module, the adhesive between the flexible support layer and the flexible display module can be prevented from cracking before an assembly process. In the assembly process of a foldable display screen, the rigid protective structure of the foldable display screen assembly is removed first, and then the foldable display screen assembly with the rigid protective structure removed is assembled with a shell, so as to obtain the foldable display screen. By setting the rigid protective structure in the foldable display screen assembly, it can be ensured that the adhesive between the flexible support layer and the flexible display module may not crack before the foldable display screen assembly is assembled with the shell. After the foldable display screen assembly is assembled with the shell, the shell can offset a rebound force generated by the flexible display module, and thus it is ensured that the adhesive between the flexible support layer and the flexible display module will not crack after the assembly process.

In the embodiments of the present disclosure, as shown in FIG. 1, by setting the curved-surface area(s) Q on the edge(s) of at least one side of the flat area P, the foldable display screen may have a curved-surface edge(s), so that a visual effect of the foldable display screen is better, and a narrow bezel of the foldable display screen is facilitated. In practical application, the curved-surface area Q may be set on the edge of any side of the flat area P, and two, three or more curved-surface areas Q may also be set on the edges of the flat area P, which is not limited here. Optionally, a foldable area may be set in the flat area P, so that the foldable display screen is folded along a folding line in the foldable area. A position of the foldable area in the flat area P may be set according to actual needs. Moreover, one or more foldable areas may be set in the flat area P, and the specific positions and quantity of the foldable areas are not limited here.

As shown in FIG. 2, in order to enable the foldable display screen to be bent, it is necessary to use flexible materials to manufacture each film layer in the flexible display module 11. For example, the flexible display module 11 may include: a display film layer 111, and a flexible cover plate 112 located on a side, facing away from the flexible support layer 12, of the display film layer 111. In a manufacturing process, each film layer in the display film layer 111 may be formed on a rigid base substrate (such as a glass substrate). The flexible cover plate 112 may be attached to the display film layer 111. Then the formed flexible display module 11 is separated from the base substrate, and the back surface S2 of the obtained flexible display module 11 is attached to the flexible support layer 12. For example, a material of the flexible cover plate 112 may be polyethylene terephthalate (PET) or polyimide (PI). In this way, the flexible cover plate 112 can protect the display film layer 111, and can also have a flexibility. When the film layer formed by the PET is thin, the hardness is small. Therefore, the flexible cover plate may be made of the PET.

Continuing to refer to FIG. 2, the flexible support layer 12 is attached to the back surface S2 of the flexible display module 11 by means of the adhesive 13. The flexible support layer 12 can play a role in supporting the flexible display module 11. On the one hand, it can be ensured that the flexible display module 11 in a non-foldable area has a good flatness, and on the other hand, it can be ensured that the foldable display screen assembly may be bent in the foldable area. For example, the flexible support layer 12 may be made of a metal material, for example, the flexible support layer 12 may be a steel sheet.

As shown in FIG. 2, since the display film layer 111 and the flexible cover plate 112 in the flexible display module 11 are both flexible, after the flexible display module 11 is attached to the flexible support layer 12, the adhesive 13 is subjected to the rebound force F1 generated by the flexible display module 11. In the embodiments of the present disclosure, the rigid protective structure 14 is attached to the side of the display surface S1 of the flexible display module 11, so that the adhesive 13 is subjected to a supporting force F2 generated by the rigid protective structure 14. The supporting force F2 may at least offset part of the rebound force F1, and thus the adhesive 13 is not prone to cracking. In the actual application process, the magnitude of the rebound force F1 may be estimated according to the elastic modulus of each film layer in the flexible display module 11, the bending degree of the curved-surface area Q and other factors. The thickness, material, bending degree and other parameters of the rigid protective structure 14 are set according to the magnitude of the rebound force F1, so that the supporting force F2 is approximately equal to the rebound force F1, and the adhesive 13 can reach a mechanical balance, thereby avoiding cracking of the adhesive 13. Optionally, in order to make a supporting effect of the rigid protective structure 14 better, a curvature of the rigid protective structure 14 in the curved-surface area Q may be set to be consistent with a curvature of the flexible display module 11 in the curved-surface area Q. In this way, the rigid protective structure 14 can be completely attached to the flexible display module 11, and thus the supporting effect of the rigid protective structure 14 is better.

During implementations, in the foldable display screen assembly provided by the embodiments of the present disclosure, as shown in FIG. 2, in the curved-surface area Q, an outer edge of the curved-surface protective portion 14q exceeds an outer edge of the curved-surface display portion 11q. In this way, the curved-surface protective portion 14q may completely cover the curved-surface display portion 11q, so that the supporting force F2 generated by the rigid protective structure 14 can better offset the rebound force F1. Moreover, the outer edge of the curved-surface protective portion 14q exceeds the outer edge of the curved-surface display portion 11q, in the subsequent assembly process of the foldable display screen, the rigid protective structure 14 can be removed more easily by clamping the part of the curved-surface protective portion 14q exceeding the curved-surface display portion 11q to tear off the rigid protective structure 14.

Figure 3:
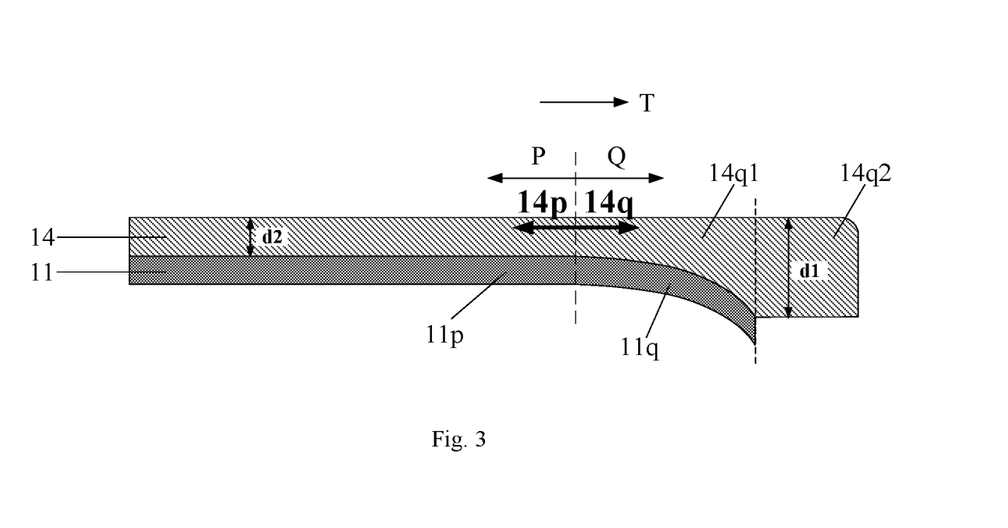
FIG. 3 is another partial enlarged schematic diagram at the dotted-line box W in FIG. 1.

FIG. 3 is another enlarged schematic diagram at the dotted-line frame W in FIG. 1. In order to illustrate the rigid protective structure more clearly, only the rigid protective structure 14 and the flexible display module 11 are shown in FIG. 3. As shown in FIG. 3, in the foldable display screen assembly provided by the embodiments of the present disclosure, a thickness d1 of the curved-surface protective portion 14q is greater than a thickness d2 of the flat protective portion 14p. The thickness of the curved-surface protective portion 14q is set to be larger, so that the hardness of the curved-surface protective portion 14q can be larger, the supporting ability to the curved-surface display portion 11q is better, and thus the supporting force F2 generated by the rigid protective structure 14 has a better offsetting effect on the rebound force F1.

Optionally, in the foldable display screen assembly provided by the embodiments of the present disclosure, as shown in FIG. 3, in a direction from the flat area P pointing to the curved-surface area Q, for example, a direction shown by an arrow T in the figure, the thickness of the curved-surface protective portion 14q tends to increase gradually. In this way, shapes of the curved-surface protective portion 14q and the curved-surface display portion 11q can be more matched, and an attaching effect of the curved-surface protective portion 14q and the curved-surface display portion 11q is better, so that the supporting ability of the curved-surface protective portion 14q to the curved-surface display portion 11q is good.

During implementations, in the foldable display screen assembly provided by the embodiments of the present disclosure, as shown in FIG. 3, a surface of a side, facing away from the flexible display module 11, of the curved-surface protective portion 14q is flush with a surface of a side, facing away from the flexible display module 11, of the flat protective portion 14p. In this way, in the manufacturing process, the foldable display screen assembly can be clamped more easily, and in a batch production process, a plurality of foldable display screen assemblies may be stacked, which facilitates batch transport of the multiple foldable display screen assemblies.

The thickness of the part (the part shown as 14q1 in the figure), attached to the curved-surface display portion 11q, in the curved-surface protective portion 14q increases gradually in the direction from the flat area P pointing to the curved-surface area Q (the direction shown by the arrow T). In this way, the shapes of the curved-surface protective portion 14q and the curved-surface display portion 11q can be more matched, so that the attaching effect of the curved-surface protective portion 14q and the curved-surface display portion 11q is better, and thus the supporting ability of the curved-surface protective portion 14q to the curved-surface display portion 11q is good.

The thickness of the part (the part shown as 14q2 in the figure), exceeding the outer edge of the curved-surface display portion 11q, in the curved-surface protective portion 14q is consistent. In this way, in the subsequent assembly process of the foldable display screen, the part 14q2, exceeding the outer edge of the curved-surface display portion 11q, in the curved-surface protective portion 14q can be clamped more easily, so that the rigid protective structure 14 is torn off more easily, that is, the rigid protective structure 14 is removed more easily.

Optionally, in the foldable display screen assembly provided by the embodiments of the present disclosure, referring to FIG. 1 and FIG. 2, the two opposite sides of the foldable display screen assembly in the flat area P have two curved-surface areas Q.

The flexible display module 11 has two curved-surface display portions 11q which are located in each curved-surface area Q respectively.

The flexible support layer 12 has two curved-surface support portions 12q which are located in each curved-surface area Q respectively.

The rigid protective structure 14 has two curved-surface protective portions 14q which are located in each curved-surface area Q respectively.

In the embodiments of the present disclosure, by setting the two curved-surface areas Q on the two opposite sides of the flat area P, the visual effect of the foldable display screen can be better, and a narrow bezel design of the foldable display screen can be achieved. In addition, by setting the curved-surface protective portion 14q in each curved-surface area Q, the curved-surface display portion 11q in each curved-surface area Q can be supported, the rebound force generated by the curved-surface display portion 11q is offset, and cracking between the curved-surface display portion 11q and the curved-surface support portion 12q is prevented. Of course, the quantity and positions of the curved-surface areas Q may also be set according to actual needs, which is not limited here.

Figure 4:
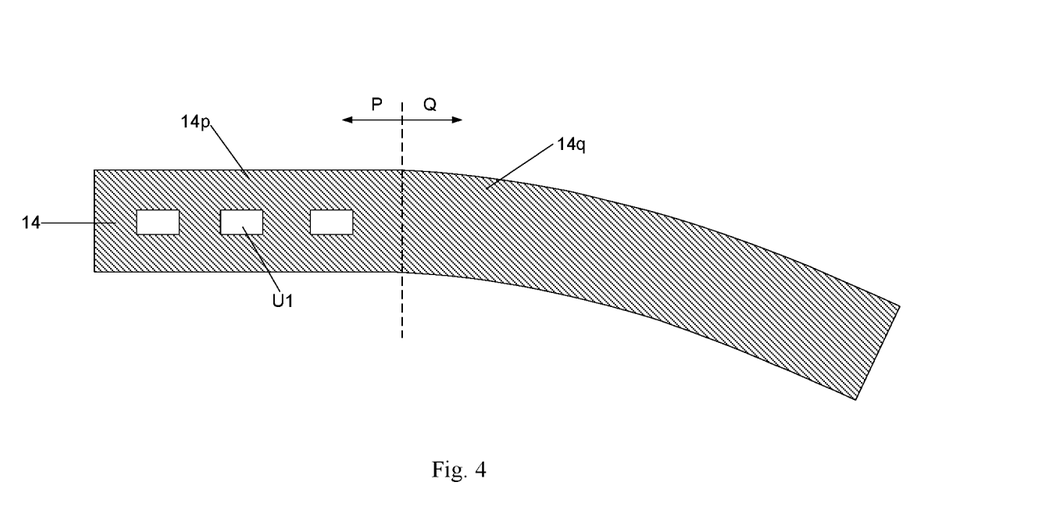
FIG. 4 is a schematic structural diagram of a rigid protective structure.
Figure 5:
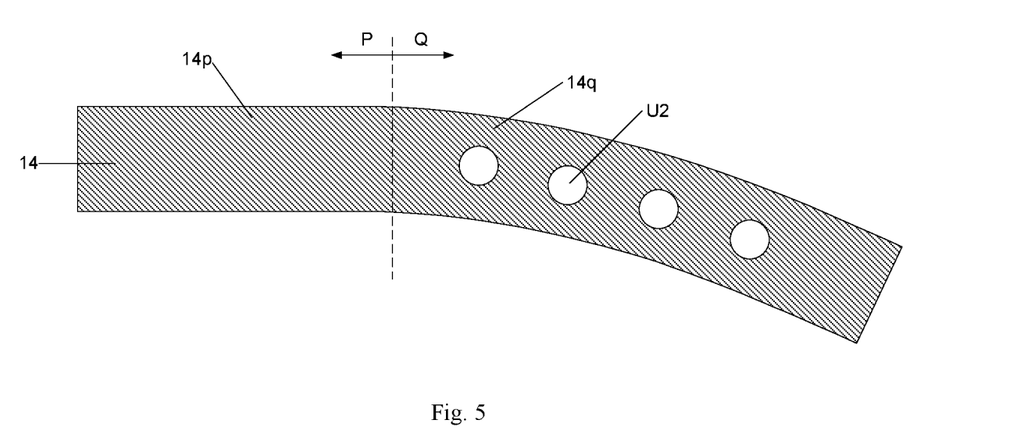
FIG. 5 is another schematic structural diagram of a rigid protective structure.

In practical application, in the foldable display screen assembly in the embodiments of the present disclosure, the rigid protective structure may be achieved in a variety of ways. Referring to FIG. 2, the rigid protective structure 14 is of a whole-layer structure; or as shown in FIG. 4, the flat protective portion 14p has a hollowed-out structure(s) U1; or as shown in FIG. 5, the curved-surface protective portion 14q has a hollowed-out structure(s) U2. In FIG. 4 and FIG. 5, the hollowed-out structures with a limited quantity are taken as examples for illustration. Moreover, the situation that the hollowed-out structure U1 is square, and the hollowed-out structure U2 is circular is taken as an example for illustration, and during implementations, the quantity and shape of the hollowed-out structure may be set according to actual needs, which is not limited here.

Optionally, in the foldable display screen assembly provided by the embodiments of the present disclosure, the elastic modulus of the rigid protective structure is greater than or equal to 7.5 GPa, so that it is ensured that the supporting effect of the rigid protective structure to the flexible display module is good, which can better offset the rebound force generated by the flexible display module. A material of the rigid protective structure may be glass, steel, polycarbonate (PC) or polyethylene terephthalate (PET). In this way, the rigid protective structure can have a large hardness, and it is ensured that the supporting effect of the rigid protective structure to the flexible display module is good. In the process, an injection molding process may be adopted to form a rigid protective film. When the thickness of the film layer formed by the PET is large, the hardness is very large. Therefore, the rigid protective structure may be made of the PET.

During implementations, in the foldable display screen assembly provided by the embodiments of the present disclosure, as shown in FIG. 2, the rigid protective structure 14 is attached to a side, facing away from the flexible support layer 12, of the flexible display module 11 by means of the an adhesive layer 15. The rigid protective structure 14 may be fixed to the side of the display surface S1 of the flexible display module 11 by means of the adhesive layer 15. Moreover, a viscosity of the adhesive layer 15 is smaller than or equal to 100 gf. In this way, in the subsequent assembly process of the foldable display screen, the rigid protective structure 14 can be removed easily, so as to avoid that due to the excessive viscosity of the adhesive layer 15, the rigid protective structure 14 cannot be removed, or the display surface S1 of the flexible display module 11 is damaged when the rigid protective structure 14 is removed.

Figure 6:
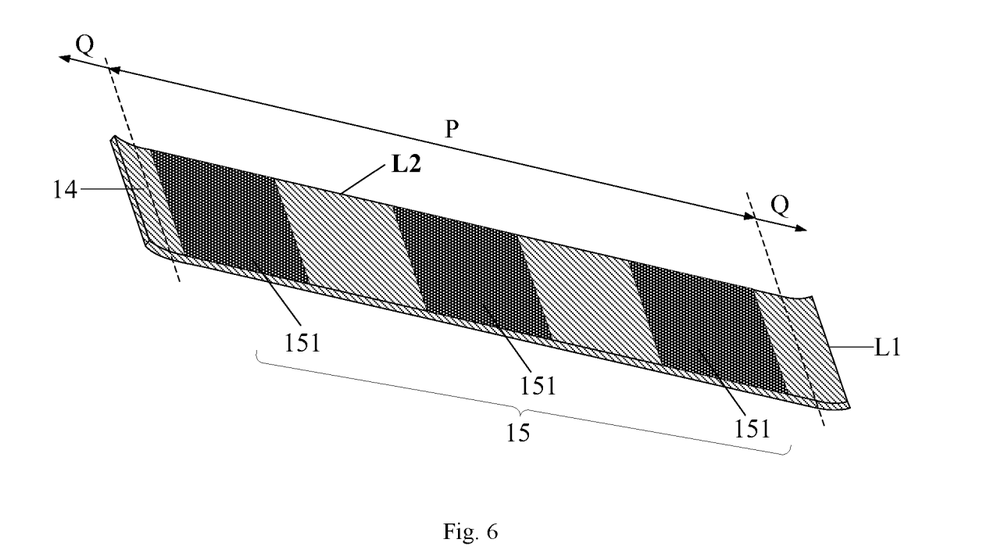
FIG. 6 is a schematic structural diagram of an inner side of a rigid protective structure.

FIG. 6 is a schematic structural diagram of an inner side of a rigid protective structure. As shown in FIG. 6, in the foldable display screen assembly provided by the embodiments of the present disclosure, the adhesive layer 15 may include: at least two discrete adhesive portions 151. In the manufacturing process, the at least two discrete adhesive portions 151 may be formed by adopting a discontinuous attaching process or coating process, so that the flat adhesive layer 15 is formed, so as to avoid affecting the bonding firmness between the rigid protective structure and the flexible display module due to bubbles generated during the whole layer of attaching or coating of the adhesive layer 15. In practical application, after the adhesive layer is formed on the inner side of the rigid protective structure, the rigid protective structure may be attached to the display surface of the flexible display module, or after the adhesive layer is formed on the display surface of the flexible display module, the rigid protective structure is attached to the display surface of the flexible display module, and a process sequence is not limited here.

In addition, in order to simplify the manufacturing process of the adhesive layer and ensure a good flatness of the adhesive layer, the adhesive layer may be set only in the flat area, that is, the adhesive layer is not set in the curved-surface area. Since the rigid protective structure is hard, the rigid protective structure is only attached to the flexible display module in the flat area, and in the curved-surface area, the rigid protective structure can still play a good role in supporting the flexible display module. In addition, the adhesive layer may also be set in the curved-surface area, and the viscosity of the adhesive layer coated in the curved-surface area may be smaller than the viscosity of the adhesive layer coated in the flat area, that is, the materials of the adhesive layers in the curved-surface area and the flat area may be different, so that the rigid protective structure can be easily removed in the subsequent assembly process.

In the foldable display screen assembly provided by the embodiments of the present disclosure, as shown in FIG. 6, the adhesive portions 151 are in strip shapes. The flat area P includes: two opposite first sides L1 and two opposite second sides L2. The curved-surface areas Q are connected to the first sides L1. An extension direction of each adhesive portion 151 is consistent with an extension direction of each first side L1, and a length of each adhesive portion 151 is consistent with a length of each first side L1. That is, the adhesive portions 151 in the adhesive layer 15 are arranged in the direction from the flat area P pointing to the curved-surface area Q, so as to firmly attach the rigid protective structure 14 to the display surface of the flexible display module.

In practical application, in the foldable display screen assembly provided by the embodiments of the present disclosure, the adhesive layer is an ultraviolet viscosity reducing adhesive, a double-sided adhesive, a pressure-sensitive adhesive or a hot-melt adhesive. When the adhesive layer is the ultraviolet viscosity reducing adhesive, in the subsequent assembly process of the foldable display screen, a mode of ultraviolet irradiation may be adopted to reduce the viscosity of the ultraviolet viscosity reducing adhesive, so as to remove the rigid protective structure. When the adhesive layer is the double-sided adhesive, in the subsequent assembly process of the foldable display screen, the rigid protective structure can be directly torn off, and thus the rigid protective structure can be easily removed. When the adhesive layer is the pressure-sensitive adhesive, in the subsequent assembly process of the foldable display screen, the viscosity of the pressure-sensitive adhesive can be reduced through a mode of changing pressure, so as to remove the rigid protective structure. When the adhesive layer is the hot-melt adhesive, in the subsequent assembly process of the foldable display screen, the viscosity of the hot-melt adhesive can be reduced through a mode of heating, so as to remove the rigid protective structure. In addition, the adhesive layer may also adopt other materials, which is not limited here.

Optionally, the foldable display screen assembly provided by the embodiments of the present disclosure, as shown in FIG. 2, may further include: a protective film 16 located between the flexible display module 11 and the rigid protective structure 14.

The protective film 16 covers the flat display portion 11$p$ and at least part of the curved-surface display portion 11$q$ of the flexible display module 11.

By setting the protective film 16 on one side of the display surface S1 of the flexible display module 11, the flexible display module 11 can be protected. In the manufacturing process of the foldable display screen assembly and the assembly process of the foldable display screen, the flexible display module 11 can be prevented from being damaged, and after the foldable display screen assembly is manufactured, and the foldable display screen assembly is assembled with a shell, the protective film 16 can be removed according to the user's needs. Of course, when the protective film 16 is a transparent film layer, the protective film 16 can also be not removed.

During implementations, in the foldable display screen assembly provided by the embodiments of the present disclosure, referring to FIG. 2, in the curved-surface area Q, an outer edge of the flexible cover plate 112 exceeds an outer edge of the protective film 16, that is, the protective film 16 does not exceed the outer edge of the flexible cover plate 112, which facilitates the subsequent removal of the protective film 16. Optionally, a distance between the outer edge of the protective film 16 and the outer edge of the flexible cover plate 112 may be about 0.5 mm. In the curved-surface area Q, an outer edge of the protective film 16 exceeds an outer edge of the adhesive layer 15. In this way, in the assembly process of the foldable display screen, the rigid protective structure 14 is removed conveniently. Optionally, a distance between an edge of the adhesive layer 15 and the edge of the protective film 16 may be about 0.5 mm.

Figure 7:
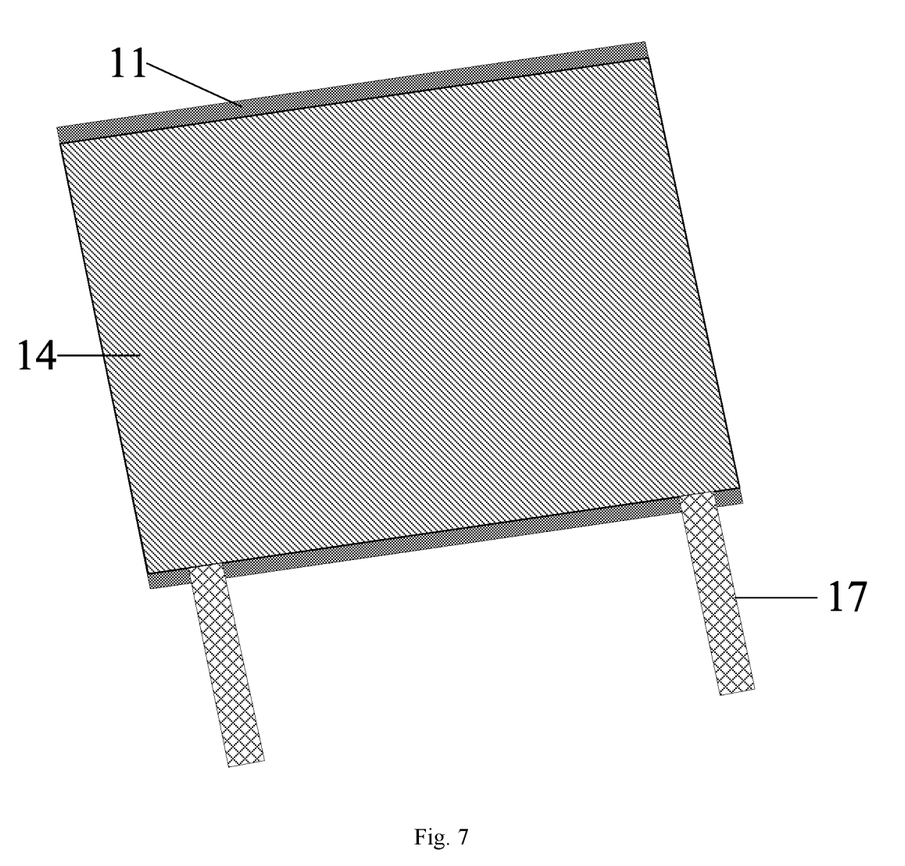
FIG. 7 is a schematic top view of a foldable display screen assembly in an embodiment of the present disclosure.

Furthermore, in the foldable display screen assembly provided by the embodiments of the present disclosure, FIG. 7 is a schematic top view of the foldable display screen assembly in the embodiments of the present disclosure. As shown in FIG. 7, the foldable display screen assembly may further include: a bonding component 17.

Figure 8:
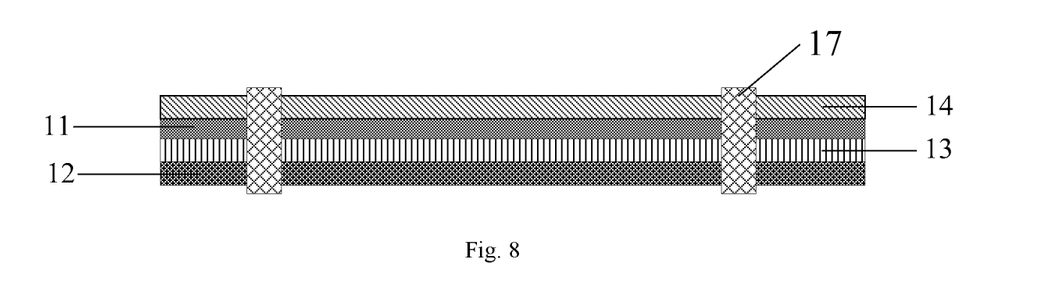
FIG. 8 is a side view of a foldable display screen assembly corresponding to FIG. 7.

FIG. 8 is a side view of a foldable display screen assembly corresponding to FIG. 7. Moreover, in order to clearly illustrate the structure of the bonding component, only the flexible display module 11, the flexible support layer 12, the adhesive 13 and the rigid protective structure 14 in the flat area are shown in FIG. 8, and other film layers are omitted. Further, referring to FIG. 8, one end of the bonding component 17 is bonded with a surface, facing away from the flexible support layer 12, of the rigid protective structure 14, and the other end is bent and bonded to a surface of a side, facing away from the rigid protective structure 14, of the flexible support layer 12. By setting the bonding component 17, a binding force between the rigid protective structure 14 and the flexible display module 11 can be further increased, so that the supporting effect of the rigid protective structure 14 is better, and cracking between the flexible display module 11 and the flexible support layer 12 is further prevented. During implementations, the bonding component 17 may be set in the flat area, so that the bonding component 17 is bonded with the surface of the rigid protective structure 14 and the surface of the flexible support layer 12. Moreover, the quantity of the bonding component 17 may be set according to actual needs, which is not limited here.

Based on the same inventive concept, embodiments of the present disclosure further provide an assembly method of any of the above foldable display screen assemblies. Since the principle of the assembly method to solve the problems is similar to the above foldable display screen assembly, the implementation of the assembly method can refer to the implementation of the above foldable display screen assembly, and the repetition will not be repeated.

Figure 9:
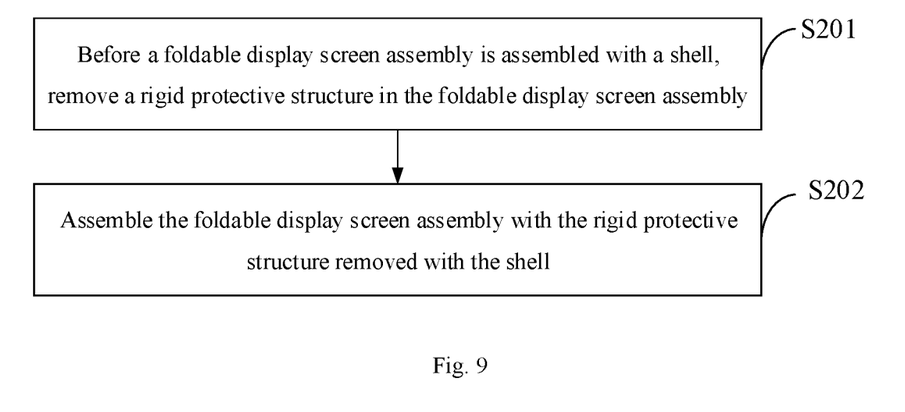
FIG. 9 is a schematic flow chart of an assembly method of any one of the above foldable display screen assemblies.

The assembly method of any of the above foldable display screen assemblies provided by the embodiments of the present disclosure, as shown in FIG. 9, includes the following steps.

S201, before a foldable display screen assembly is assembled with a shell, a rigid protective structure in the foldable display screen assembly is removed.

S202, the foldable display screen assembly with the rigid protective structure removed is assembled with the shell.

In the embodiments of the present disclosure, by setting the rigid protective structure in the foldable display screen assembly, it can be ensured that the adhesive between the flexible support layer and the flexible display module may not crack before the foldable display screen assembly is assembled with the shell. Moreover, after the foldable display screen assembly is assembled with the shell, the shell can offset the rebound force generated by the flexible display module, and thus it is ensured that the adhesive between the flexible support layer and the flexible display module will not crack after the assembly process.

In step S201, when the adhesive layer is an ultraviolet viscosity reducing adhesive, a mode of ultraviolet irradiation may be adopted to reduce the viscosity of the ultraviolet viscosity reducing adhesive, so as to remove the rigid protective structure. When the adhesive layer is a double-sided adhesive, the rigid protective structure can be directly torn off, and thus the rigid protective structure can be easily removed. When the adhesive layer is a pressure-sensitive adhesive, the viscosity of the pressure-sensitive adhesive can be reduced through a mode of changing pressure, so as to remove the rigid protective structure. When the adhesive layer is a hot-melt adhesive, the viscosity of the hot-melt adhesive can be reduced through a mode of heating, so as to remove the rigid protective structure.

In step S202, the foldable display screen assembly with the rigid protective structure removed is assembled with the shell, so that the shell supports the flexible display module, so as to offset a rebound force generated by the flexible display module, and it is ensured that the adhesive between the flexible support layer and the flexible display module will not crack after the assembly process.

Obviously, those skilled in the art can make various changes and modifications to the present disclosure without departing from the spirit and scope of the present disclosure. As such, provided that these modifications and variations of the present disclosure fall within the scope of the claims of the present disclosure and their equivalents, the present disclosure is also intended to cover such modifications and variations.

What is claimed is:

1. A foldable display screen assembly comprising:
  a flat area; and
  a curved-surface area connected to the flat area on an edge of at least one side of the flat area;
  wherein the foldable display screen assembly further comprises:
  a flexible display module, comprising:
    a flat display portion in the flat area; and
    a curved-surface display portion in the curved-surface area;
    wherein the curved-surface display portion is connected to the flat display portion, and the flexible display module further comprises:
    a display surface; and
    a back surface opposite to the display surface;
  a flexible support layer, attached to the back surface of the flexible display module by an adhesive and comprising:
    a flat support portion in the flat area; and
    a curved-surface support portion in the curved-surface area;
    wherein the curved-surface support portion is connected to the flat support portion; and
  a rigid protective structure, attached to the display surface of the flexible display module and comprising:
    a flat protective portion in the flat area; and
    a curved-surface protective portion in the curved-surface area;
    wherein the curved-surface protective portion is connected to the flat protective portion;
  wherein an elastic modulus of the rigid protective structure is greater than an elastic modulus of the flexible support layer; and
  wherein the flat protective portion is provided with a hollowed-out structure; and/or the curved-surface protective portion is provided with a hollowed-out structure.

2. The foldable display screen assembly according to claim 1, wherein in the curved-surface area, an outer edge of the curved-surface protective portion exceeds an outer edge of the curved-surface display portion.

3. The foldable display screen assembly according to claim 2, wherein a thickness of the curved-surface protective portion is greater than a thickness of the flat protective portion.

4. The foldable display screen assembly according to claim 3, wherein in a direction from the flat area pointing to the curved-surface area, the thickness of the curved-surface protective portion tends to increase gradually.

5. The foldable display screen assembly according to claim 4, wherein:
  a surface of a side, facing away from the flexible display module, of the curved-surface protective portion is flush with a surface of a side, facing away from the flexible display module, of the flat protective portion;
  a thickness of a part, attached to the curved-surface display portion, in the curved-surface protective portion increases gradually in the direction from the flat area pointing to the curved-surface area; and
  a thickness of a part, exceeding the outer edge of the curved-surface display portion, in the curved-surface protective portion is consistent.

6. The foldable display screen assembly according to claim 1, wherein the elastic modulus of the rigid protective structure is greater than or equal to 7.5 GPa.

7. The foldable display screen assembly according to claim 6, wherein a material of the rigid protective structure is:
  glass, or
  steel, or
  polycarbonate, or
  polyethylene terephthalate.

8. The foldable display screen assembly according to claim 1, wherein:
  the rigid protective structure is attached to a side, facing away from the flexible support layer, of the flexible display module by an adhesive layer; and
  an adhesive and peel strength of the adhesive layer is smaller than or equal to 100 gf.

9. The foldable display screen assembly according to claim 8, wherein the adhesive layer comprises:
  at least two discrete adhesive portions.

10. The foldable display screen assembly according to claim 9, wherein:
  the adhesive portions are in strip shapes;
  the flat area comprises:
    two opposite first sides; and
    two opposite second sides;
    wherein the curved-surface area is connected to the first sides;
  an extension direction of at least one of the adhesive portions is consistent with an extension direction of the first side; and
  a length of at least one of the adhesive portions is consistent with a length of the first side.

11. The foldable display screen assembly according to claim 8, wherein the adhesive layer is:
  an ultraviolet viscosity reducing adhesive, or
  a double-sided adhesive, or
  a pressure-sensitive adhesive, or
  a hot-melt adhesive.

12. The foldable display screen assembly according to claim 8, wherein:
  the flexible display module further comprises:
    a display film layer; and
    a flexible cover plate on a side, facing away from the flexible support layer, of the display film layer;
  the foldable display screen assembly further comprises:
    a protective film between the flexible display module and the rigid protective structure;
    wherein the protective film covers the flat display portion and at least part of the curved-surface display portion of the flexible display module.

13. The foldable display screen assembly according to claim 12, wherein:

in the curved-surface area, an outer edge of the flexible cover plate exceeds an outer edge of the protective film; and/or in the curved-surface area, an outer edge of the protective film exceeds the outer edge of the adhesive layer.

14. The foldable display screen assembly according to claim 1, further comprising:
a bonding component;
wherein one end of the bonding component is bonded with a surface, facing away from the flexible support layer, of the rigid protective structure, and another end of the bonding component is bent and bonded to a surface of a side, facing away from the rigid protective structure, of the flexible support layer.

15. The foldable display screen assembly according to claim 8, wherein the adhesive layer is:
set only in the flat area; or
set in both the flat area and the curved-surface area.

16. The foldable display screen assembly according to claim 15, wherein when the adhesive layer is set in both the flat area and the curved-surface area, a viscosity of the adhesive layer in the curved-surface area is smaller than a viscosity of the adhesive layer in the flat area.

17. A foldable display screen assembly comprising:
a flat area; and
a curved-surface area connected to the flat area on an edge of at least one side of the flat area;
wherein the foldable display screen assembly further comprises:
a flexible display module, comprising:
a flat display portion in the flat area; and
a curved-surface display portion in the curved-surface area;
wherein the curved-surface display portion is connected to the flat display portion, and the flexible display module further comprises:
a display surface; and
a back surface opposite to the display surface;
a flexible support layer, attached to the back surface of the flexible display module by an adhesive and comprising:
a flat support portion in the flat area; and
a curved-surface support portion in the curved-surface area;
wherein the curved-surface support portion is connected to the flat support portion; and
a rigid protective structure, attached to the display surface of the flexible display module and comprising:
a flat protective portion in the flat area; and
a curved-surface protective portion in the curved-surface area;
wherein the curved-surface protective portion is connected to the flat protective portion;
wherein an elastic modulus of the rigid protective structure is greater than an elastic modulus of the flexible support layer; in the curved-surface area, an outer edge of the curved-surface protective portion exceeds an outer edge of the curved-surface display portion; a thickness of the curved-surface protective portion is greater than a thickness of the flat protective portion;
a surface of a side, facing away from the flexible display module, of the curved-surface protective portion is flush with a surface of a side, facing away from the flexible display module, of the flat protective portion;
a thickness of a part, attached to the curved-surface display portion, in the curved-surface protective portion increases gradually in a direction from the flat area pointing to the curved-surface area; and a thickness of a part, exceeding the outer edge of the curved-surface display portion, in the curved-surface protective portion is consistent.

18. A foldable display screen assembly comprising:
a flat area; and
a curved-surface area connected to the flat area on an edge of at least one side of the flat area;
wherein the foldable display screen assembly further comprises:
a flexible display module, comprising:
a flat display portion in the flat area; and
a curved-surface display portion in the curved-surface area;
wherein the curved-surface display portion is connected to the flat display portion, and the flexible display module further comprises:
a display surface; and
a back surface opposite to the display surface;
a flexible support layer, attached to the back surface of the flexible display module by an adhesive and comprising:
a flat support portion in the flat area; and
a curved-surface support portion in the curved-surface area;
wherein the curved-surface support portion is connected to the flat support portion; and
a rigid protective structure, attached to the display surface of the flexible display module and comprising:
a flat protective portion in the flat area; and
a curved-surface protective portion in the curved-surface area;
wherein the curved-surface protective portion is connected to the flat protective portion;
wherein an elastic modulus of the rigid protective structure is greater than an elastic modulus of the flexible support layer; the rigid protective structure is attached to a side, facing away from the flexible support layer, of the flexible display module by an adhesive layer; an adhesive and peel strength of the adhesive layer is smaller than or equal to 100 gf;
wherein the flexible display module further comprises:
a display film layer; and
a flexible cover plate on a side, facing away from the flexible support layer, of the display film layer;
the foldable display screen assembly further comprises:
a protective film between the flexible display module and the rigid protective structure;
wherein the protective film covers the flat display portion and at least part of the curved-surface display portion of the flexible display module;
wherein in the curved-surface area, an outer edge of the flexible cover plate exceeds an outer edge of the protective film; and/or in the curved-surface area, an outer edge of the protective film exceeds the outer edge of the adhesive layer.

19. The foldable display screen assembly according to claim 18, wherein the adhesive layer comprises:
at least two discrete adhesive portions.

20. The foldable display screen assembly according to claim 19, wherein:
the adhesive portions are in strip shapes;
the flat area comprises:
two opposite first sides; and
two opposite second sides;
wherein the curved-surface area is connected to the first sides;

an extension direction of at least one of the adhesive portions is consistent with an extension direction of the first side; and a length of at least one of the adhesive portions is consistent with a length of the first side.

* * * * *